US010589378B2

(12) United States Patent
Beransky et al.

(10) Patent No.: US 10,589,378 B2
(45) Date of Patent: Mar. 17, 2020

(54) CONVEYOR SYSTEM FOR HIGH PRODUCTION LASER CUTTING AUTOMATED SYSTEM

(71) Applicant: Amada America, Inc., Buena Park, CA (US)

(72) Inventors: Michael Beransky, Irvine, CA (US); Mihai Cioclei, Chino Hills, CA (US); Joseph Elkin, Deerfield, IL (US); Jose Garcia, Los Angeles, CA (US)

(73) Assignee: Amada America, Inc., Buena Park, CA (US)

( * ) Notice: Subject to any disclaimer, the term of this patent is extended or adjusted under 35 U.S.C. 154(b) by 509 days.

(21) Appl. No.: 15/064,540

(22) Filed: Mar. 8, 2016

(65) Prior Publication Data

US 2017/0259376 A1 Sep. 14, 2017
US 2020/0047284 A9 Feb. 13, 2020

Related U.S. Application Data

(63) Continuation-in-part of application No. 13/987,002, filed on Jun. 24, 2013, now abandoned.

(51) Int. Cl.
*B23K 26/08* (2014.01)
*B23K 26/38* (2014.01)
*B65G 19/06* (2006.01)
*B23K 101/18* (2006.01)

(52) U.S. Cl.
CPC .......... *B23K 26/0838* (2013.01); *B23K 26/38* (2013.01); *B65G 19/06* (2013.01); *B23K 2101/18* (2018.08); *B65G 2201/022* (2013.01)

(58) Field of Classification Search
CPC ................ B23K 26/0838; B23K 26/38; B23K 2201/18; B65G 19/06
See application file for complete search history.

(56) References Cited

U.S. PATENT DOCUMENTS

| | | | | |
|---|---|---|---|---|
| 5,590,758 A * | 1/1997 | Wilkins | ............... | B65G 17/005 198/440 |
| 5,632,915 A * | 5/1997 | Schnetzer | .......... | B23K 26/0838 198/689.1 |
| 6,377,864 B1 * | 4/2002 | Lindstrom | ......... | G05B 19/4189 700/96 |
| 2003/0118229 A1 * | 6/2003 | Andrews | ............... | B23Q 15/013 382/141 |
| 2004/0202531 A1 * | 10/2004 | Beransky | ............. | B23K 26/083 414/331.18 |
| 2009/0212033 A1 * | 8/2009 | Beck | ................... | B23K 26/0846 219/121.72 |
| 2012/0067985 A1 * | 3/2012 | Smith | .................... | E01C 19/203 239/672 |
| 2014/0374390 A1 * | 12/2014 | Beransky | ........... | B23K 37/0235 219/121.7 |

* cited by examiner

*Primary Examiner* — Tu B Hoang
*Assistant Examiner* — Vy T Nguyen
(74) *Attorney, Agent, or Firm* — Cionca IP Law P.C.; Marin Cionca

(57) ABSTRACT

A laser cutting system wherein a conveyor system indexes sheet material through various processing stations, the processing stations operating simultaneously during the time period when the conveyor is stopped and wherein the conveyor system is in the form of an endless belt.

7 Claims, 15 Drawing Sheets

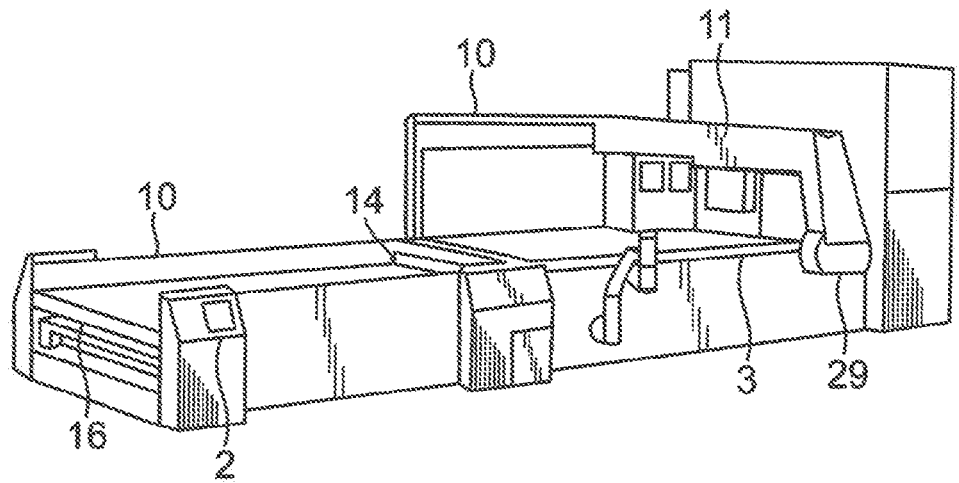
FIG. 1 - Prior Art
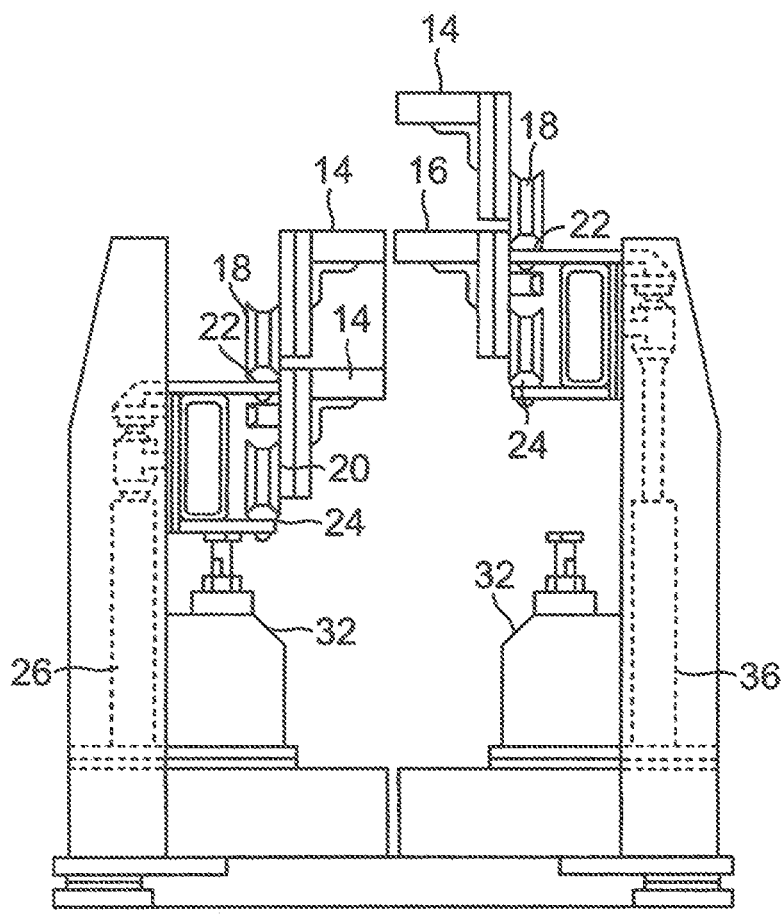
FIG. 2 - Prior Art

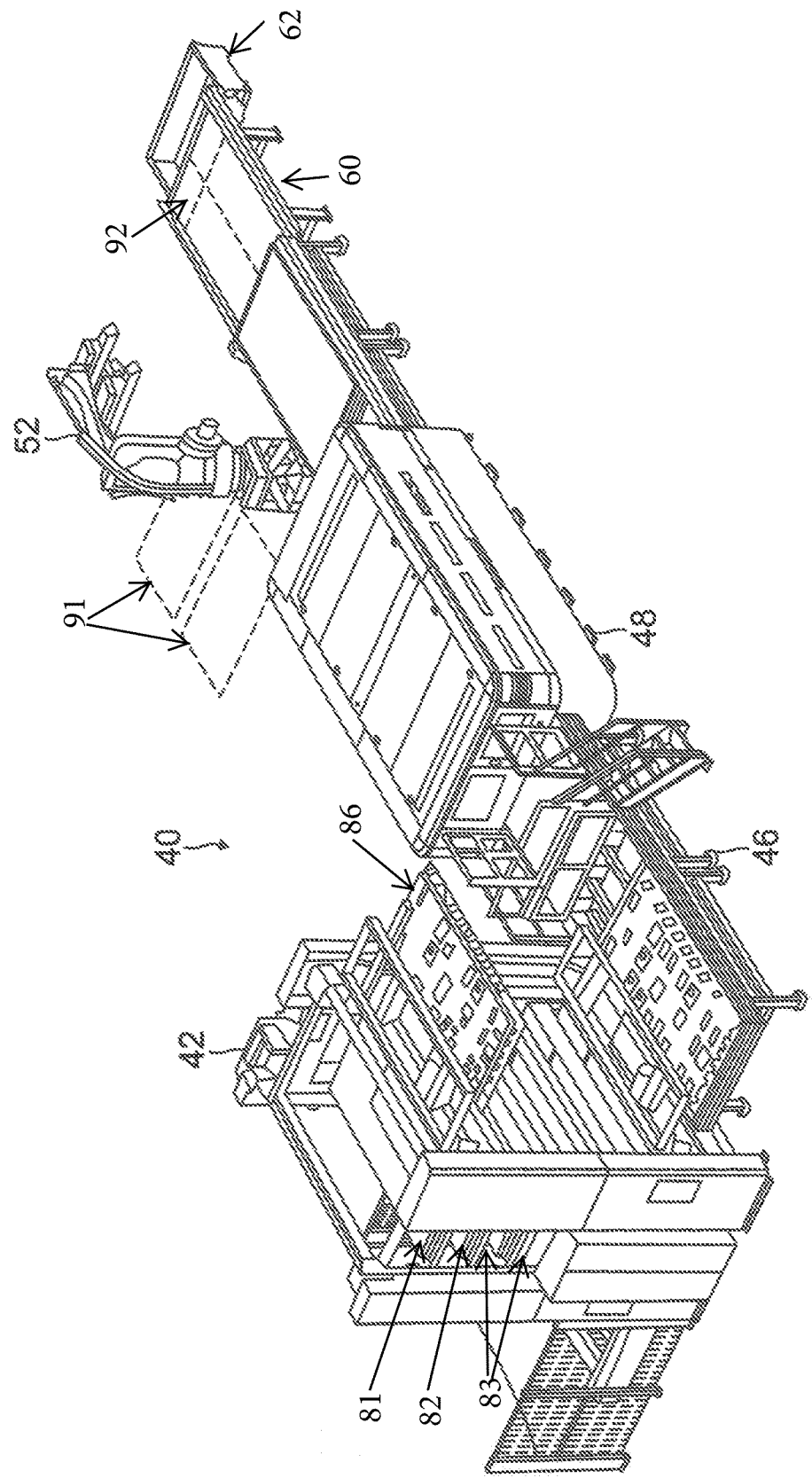

CONVEYOR SYSTEM FOR HIGH PRODUCTION LASER CUTTING AUTOMATED SYSTEM

RELATED APPLICATIONS

This application is a continuation-in-part of application Ser. No. 13/987,002, filed Jun. 24, 2013.

BACKGROUND OF THE INVENTION

1. Field of the Invention

The present invention provides an improved conveyor adapted for use in a system that loads, processes (cuts), sorts and stacks a variety of sheet metal parts, the cutting process being performed by a high-speed laser.

2. Description of the Prior Art

Sheet metal products are typically formed in a piece of sheet metal and connected to the sheet metal through one or more micro-joints. In order to separate these pans, it is conventional that subsequent mechanical or manual hammering or vibrating is carried out with respect to the sheet metal.

The use of a moving table to transport sheet metal is a highly effective system when the laser unit operates at a slower pace. However, for faster laser units, which require processing complete sheets in less than two minutes, the conventional moving table systems have been found to be inefficient. When the total load, cut, unload and sort process for a metal sheet is to be completed in two minutes or less, a high-speed conveying system is required.

U.S. Pat. No. 8,253,064 to Beck et al discloses a laser blanking device for high-speed cutting of material that uses synchronized laser cutting operations along multiple axes and on a continuously moving coil strip.

The coil strip is moved through the device at a velocity substantially equal to the velocity of the moving pin conveyor.

The system is designed to increase production rates by minimizing stationary periods; this is accomplished by increasing the speed of the cutting operation of rapidly fed coil stock (a "coil" of material weights between 5,000 and 40,000 pounds; changing between material types will take between 20-40 minutes). The problem with this is the inability to change material type and thickness quickly enough to keep up with a "high mix low volume" environment.

A fiber laser cutting system (designated the FOL-AJ) for cutting material has been developed by Amada America, Buena Park, Calif. and is designed to take full advantage of the unique cutting capabilities of fiber laser processing. The advanced motion system and an innovative beam delivery system keeps pace with the cutting speeds and capabilities of the fiber resonator. The result is an extremely productive fiber laser system that delivers speed, accuracy, and edge quality, even in thick sheets.

Although moving tables have been successfully utilized in the cutting operation noted hereinabove, there are inherent limitations in their use with high-speed laser systems, such as the FOL-AJ. Specifically, Amada is currently marketing a FOL-AJ based system using a plurality of moving tables to convey material to the laser cutter. In this system, the movable table is loaded with material, the table traveling into/out of the laser device for each cycle. The empty moving table is loaded with the new material while the laser is processing the previously loaded material. After a moving table delivers the loaded material to the laser, and the material exits the laser, a different moving table is loaded with new material (a robot first unloads the cut parts before new material can be loaded onto a moving table). In addition, scraps must be unloaded before new material is loaded onto a moving table. Although this system performs extremely well, the use of moving tables in the process limits the processing speeds and, as a result, the processing times are less than desired for certain applications.

The system disclosed in the '064 patent as noted hereinabove is also limited because of its inability to change sheet material type and thickness rapidly as is required in current system applications (as noted hereinabove, the '064 system takes between 20 and 40 minutes to change material; the FOL-AJ system takes approximately two minutes to change material). In addition, part separations by gravity used in the '064 system is limited to simple part geometries (i.e. round, rectangular and square) because more complex geometries will hang up in the skeleton and not drop correctly.

Standard endless belt conveyors move material, parts, etc. from one location to another at normal conditions. However, prior art endless conveyor belt or chain are not capable of passing through the inside of the laser cutting machine without damage from the laser beam, dust and slugs generated during the laser cutting process (the term "slug" refers to the buildup of material from metal cutting/melting).

Patent application Ser. No. 13/987,002, filed on Jun. 24, 2013 and assigned to the assignee of the present invention, discloses a laser cutting system wherein a conveyor system indexes sheet material through various processing stations. The conveyor is configured as a chain type member that moves in an endless loop. Although the system described therein performs well, an improved conveyor system would be desirable.

What is thus desired is to provide an improved material conveyor system adapted for use in laser processing systems which overcome the disadvantages of using the prior art systems as noted hereinabove and improves upon the basic conveyor system disclosed in the '002 application.

SUMMARY OF THE INVENTION

The present invention provides an automated system for handling material and parts and scrap cut therefrom and in particular, an improved conveyor system that enables high-speed laser material cutting.

The system uses a conveyor for the material, the conveyor moving sheet material into the laser for cutting purposes. The empty conveyor space is loaded with new material as the laser is processing the previously loaded sheet of material. The conveyor is indexed one position such that new sheet material is loaded into the laser as processed material is moved from the laser to the part unloading station, both processes occurring at the same time.

A robot then unloads the parts from the processed sheet material while new sheet material is being loaded on the side of the conveyor opposite where the laser is positioned. The conveyor is further indexed and scrap is automatically unloaded, all the processes occurring simultaneously.

The conveyor features noted hereinabove significantly decreases the system processing time compared to systems using moving (shuttle) tables and is particularly adaptable for use with high-speed lasers, such as the FOL-AJ system noted hereinabove.

The sheet metal material is precut to specific lengths, allowing many types and thicknesses of material to be loaded and processed on a sheet by sheet basis. Parts are picked up by a robot and stacked in preparation for the next process (bending, welding, etc.). Scrap is destructed during the last process and is automatically dumped into a scrap box as the conveyor indexes. A material storage tower with a sheet by sheet loading process is also provided.

An important feature of the present invention is the provision of multiple chain rows to support the material and create clearance for slug drop-down. Since the chain is passing through the laser, structure is provided to support the chain on the top and bottom and to protect the chain from damage that normally would be generated during the laser cutting operation.

DESCRIPTION OF THE DRAWINGS

For a better understanding of the present invention as well as other objects and further features thereof, reference is made to the following description which is to be read in conjunction with the accompanying drawing wherein:

FIGS. 1 and 2 are views of a prior art conveyor system;

FIG. 3 is a perspective view of the conveyor system of the present invention used in a laser material cutting system;

DESCRIPTION OF THE INVENTION

Figure 4:
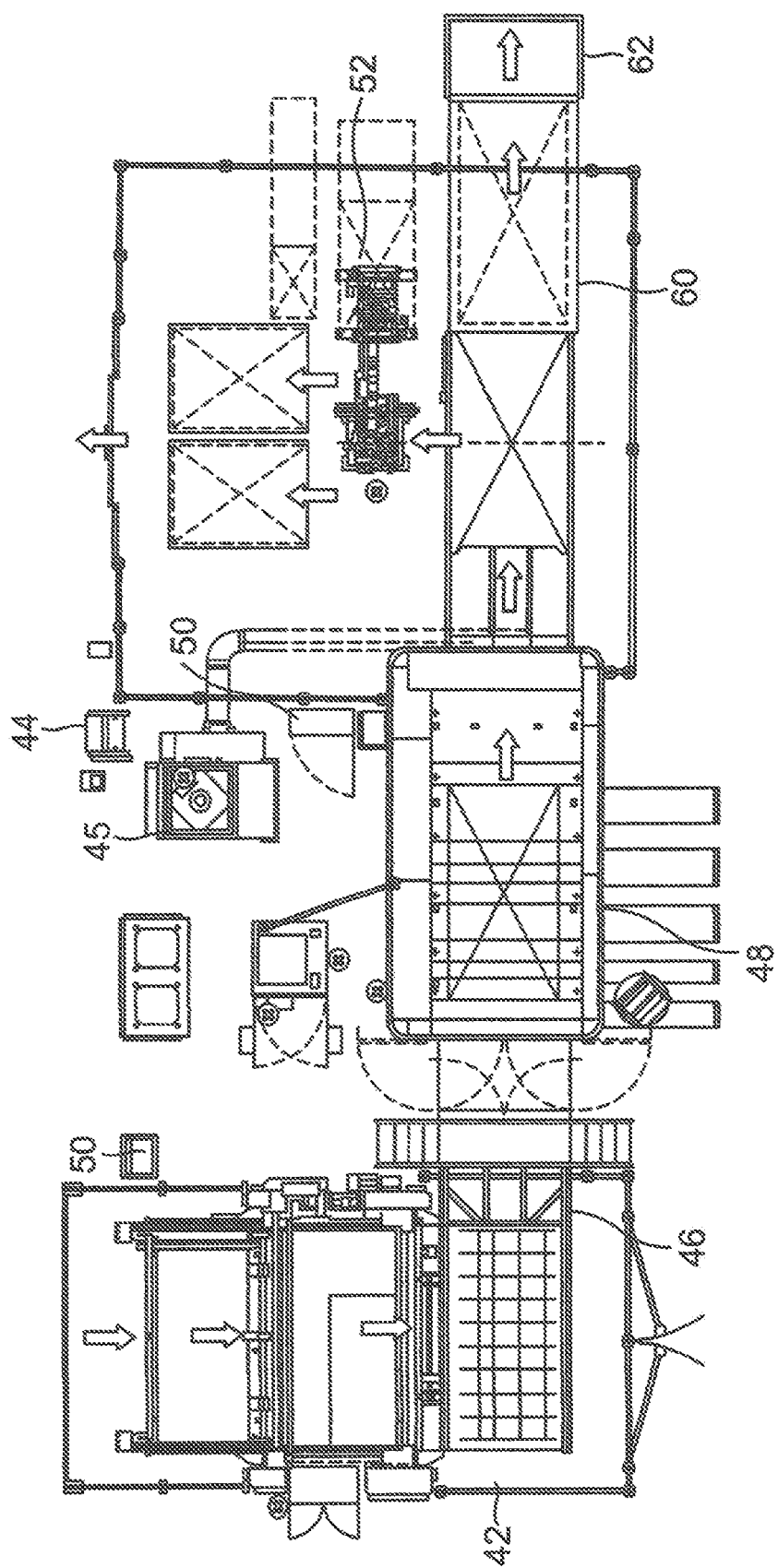
FIG. 4 is a plan view of the system shown in FIG. 1 illustrating the movement of the material through the system stations.
Figure 5:
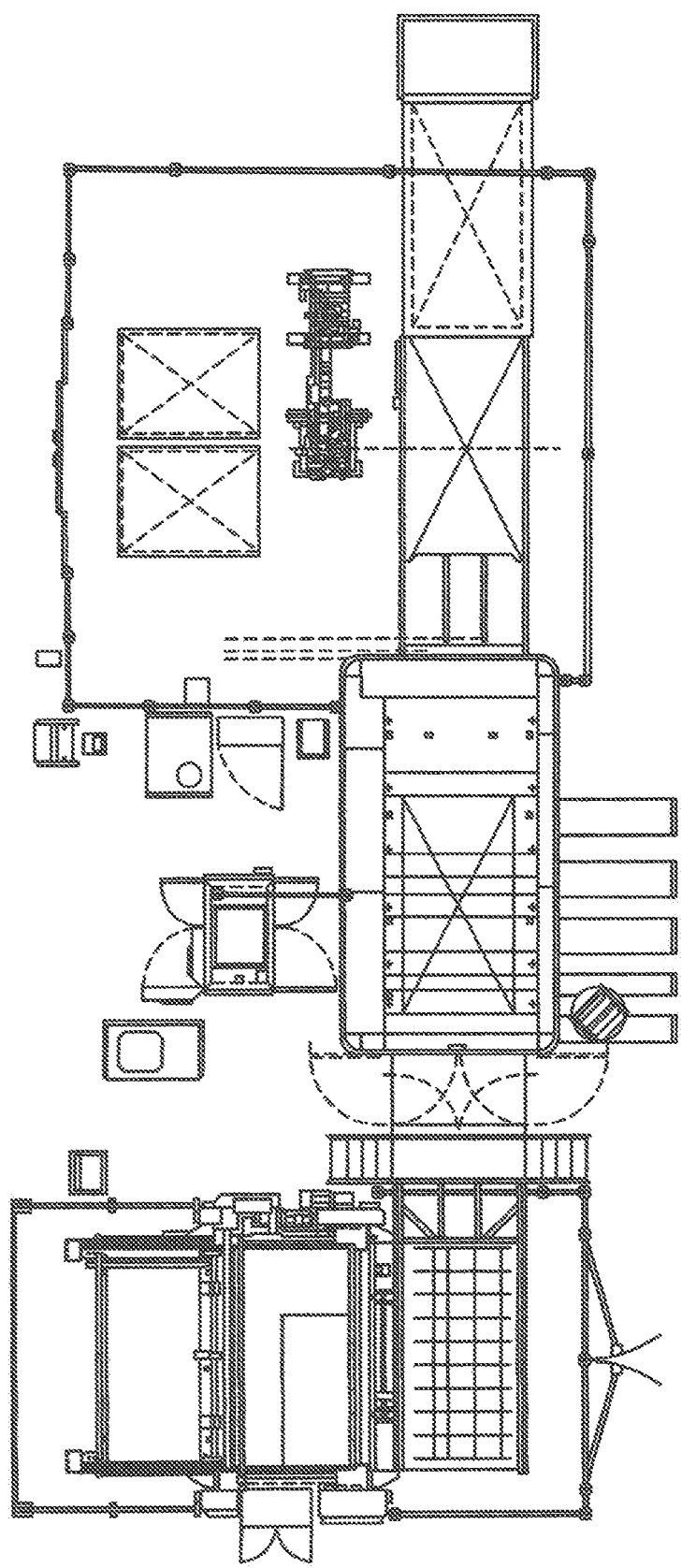
FIG. 5 illustrates the positioning of the conveyor during system operation.

FIGS. 1 and 2 illustrate a prior art system 10 for handling material and parts cut therefrom utilizing movable tables, such as shuttles described in co-pending Ser. No. 13/987,002 filed Jun. 24, 2013. System 10 comprises laser cutting device 11, shuttle table 12 upper shuttle cart 14, lower shuttle cart 16, cart wheels 18 and 20, tracks 22 and 24, and cylinders 26 and 36. Cylinders 26 and 36 operate to raise and lower shuttle carts 14 and 16 respectively, in a predetermined sequence such that the carts can he aligned with the tracks associated with laser cutting device 11. In essence, the shuttle carts 14 and 16 are used to both transport sheet material to the laser cutting device 11 and to remove the sheet material after parts are cut therein (the skeleton).

FIG. 3 illustrates the apparatus utilized to cut parts from sheet material by the cutting system 40 using, the conveyor 46 of the present invention.

(a) The system operator sets up raw material storage in tower 42. The material size, thickness, type, sheet quantity, and shelf 83 location are recorded in a microprocessor as will be described hereinafter.

(b) The system operator then sets up a processing schedule for processor 44 (FIG. 4) utilized to control the system 40. The program number, material name, and run quantity are entered in sequence. The software runs on a conventional Windows OS computer (a flowchart illustrating the program steps is illustrated in FIGS. 6-12).

(c) The system operator initiates system operation by turning on processor 44.

(d) A raw material sheet 81, 82 is loaded onto conveyor 46 from storage tower 42 by loading cart 86 that is movably attached to the storage tower 42, according to the schedule requirement stored in processor 44.

(e) Conveyor 46 moves a sheet of raw material from an initial position (Position #1) to the second position (Position #2) in preparation for laser cutting by laser device 48. The storage tower 42 readies the next sheet in sequence for loading.

(f) When the material sheet is confirmed in position by a sensor (not shown) for laser cutting, the laser cutting system 48 executes the laser program portion of the software (the software determines the dimensions of the part to be cut) and storage tower 42 loads the next sheet of raw material to the first conveyor position.

(g) When storage tower 42 finishes sheet loading at the first conveyor position and laser cutting system 48 finishes cutting at the second position, the conveyor system control 50 (FIG. 4) advances the cut sheet to a third position (Position #3) for unloading and the raw sheet material loaded at Position #1 advances to the Position #2 at the same time.

(h) Storage tower 42 then loads new raw material to conveyor Position #1 as required by the software, laser cutting system 48 continues laser cutting at Position #2, and a parts-sorting robot 52 starts the unloading sequence at Position #3.

(i) Robot 52 stacks cut parts according to the software program. When stacking, laser cutting and raw material sheet-loading is complete at conveyor Position #3, 2, and 1 (respectively), conveyor 46 advances—repeating the processes as set forth hereinabove in accordance with the schedule established by the software.

(j) As conveyor 46 advances, the skeleton sections remaining after the programmed parts are cut are forwarded from conveyor Position #3 and dropped onto the skeleton conveyor 60, which moves skeleton parts 92 forward so they drop into the skeleton collection bin 62. The skeleton conveyor 60 advances simultaneously with the conveyor 46.

Robot 52 stacks cut parts 91 at the scheduled quantity at a designated location (the system operator ensures that the stack height is limited to one that is stable) and includes sensors (not shown) to detect hanging, tipped-up, and missed pick-up of parts, and will stop system operation as these conditions occur.

Figure 13:
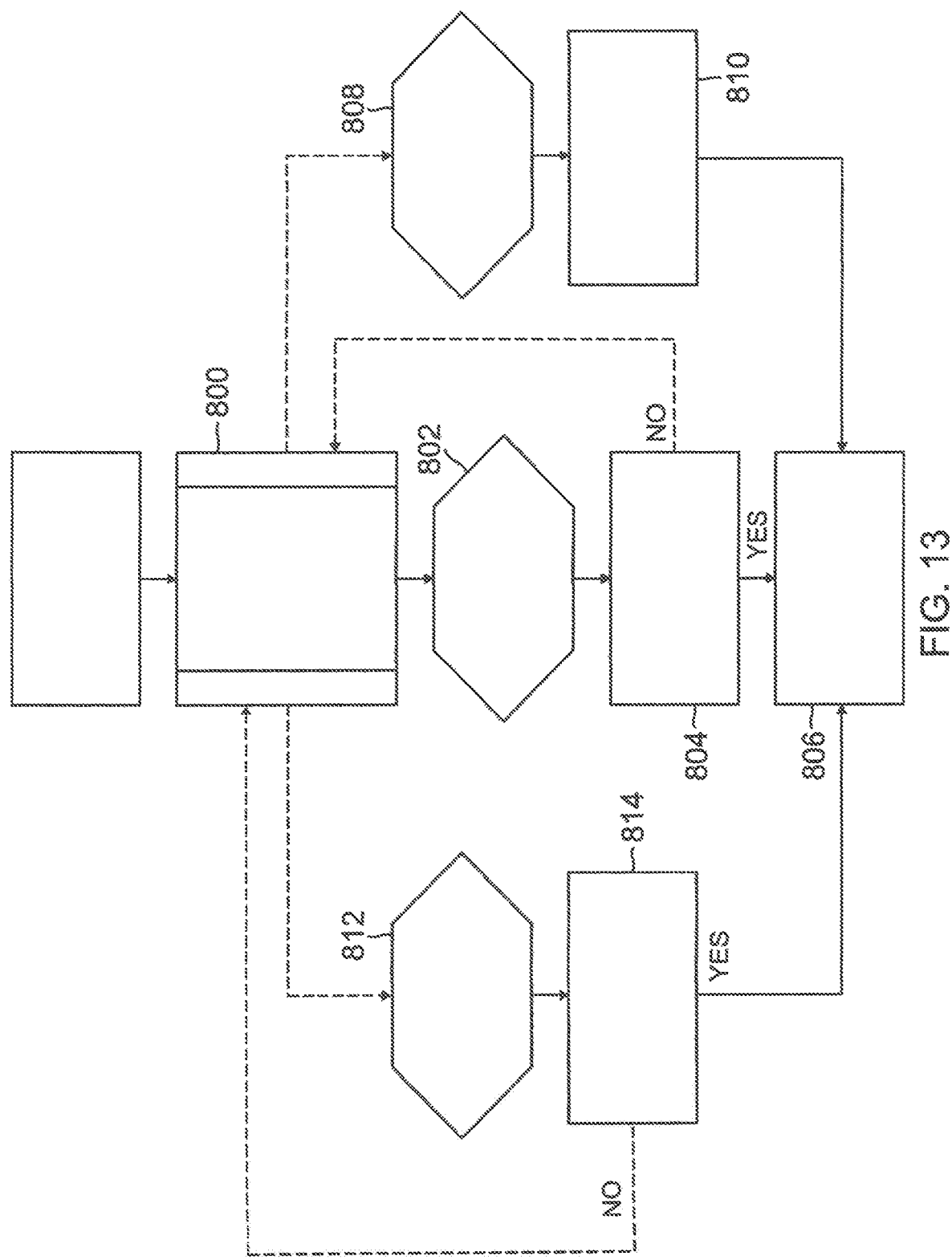

Robot 52 fault recovery is at the operator's option, the flowchart therefor being shown in FIG. 13. Robot 52 may retry, skip current part pick-up, or abort parts pick-up from the output cut sheet. Parts not unloaded from the conveyor system by robot 52 may be retrieved at the outer end of the skeleton conveyor by hand (the operator may manually "Jog" the skeleton conveyor forward to access parts); the operator preventing the parts from dropping into the skeleton collection bin 62.

The operator stops the robot operation in order to enter the unloading area where unload carts are positioned. The operation resumes once the operator exits the area.

As noted hereinabove, flowchart for the software used to control the system of the present invention is shown in FIGS. 6-12. The software runs on a conventional Windows OS computer and sends job data to the laser process machine automation system. The job data includes the location, size and thickness of the raw material and the numerical control ("NC") program to be executed in the laser process machine and parts sorting data to be executed by the parts-sorting robot.

The aforementioned data are sent at different but synchronized timing as the system control requires.

The software schedules a plurality of job data so that the laser cutting system can be operated unattended for a period of time. The schedule is entered into the software by a human operator (or automatically loaded using a predetermined interface method).

The software is able to detect alarms which occur on the laser cutting system and then send notification messages to those involved in the system operation; in addition, the computer outputs production result information for the system operator.

The use of an endless chain conveyor system instead of conventional movable tables for handling sheet material enables the four processes (load, cutting, unload, and scrap removal) to be done simultaneously and continually at very rapid speeds (a single sheet of material can be processed in approximately thirty seconds). As will be described hereinafter, the chain conveyor system is configured to resist damage as it travels through the laser cutter.

Referring to FIGS. 6-12, the operational flowchart for system 40 is illustrated.

Figure 6:
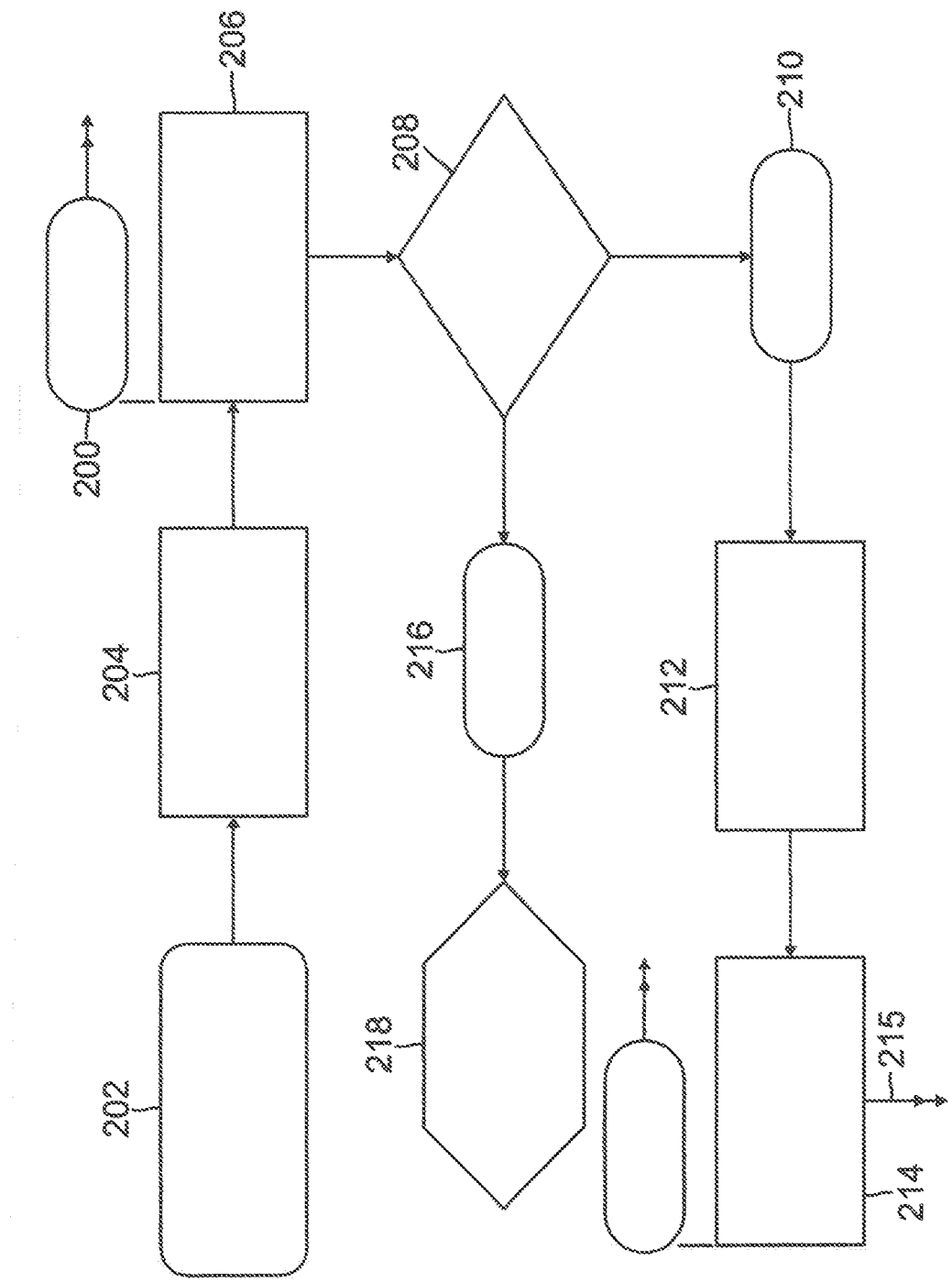
FIGS. 6-13 are computer flowcharts for the operation of the conveyor system of the present invention.

FIG. 6 shows a process start block (200) which, when activated by an operator, causes system 10 to be initialized and the laser cutting operation to proceed. All safety interlocks are placed in the ready state (block 202) which, in turn, causes the computer to start the software process (block 204), causing the conveyor controller 50 to receive a sheet load command (block 206). If the required sheet is determined to be present (blocks 208 and 210), the sheet is loaded to the conveyor first position (block 212). A sensor then determines if the material is loaded successfully (block 214). The next process sequence is initiated via a signal on lead 215; if the required sheet is not in the material storage tower (block 216), an alarm is sounded (block 218).

Figure 7:
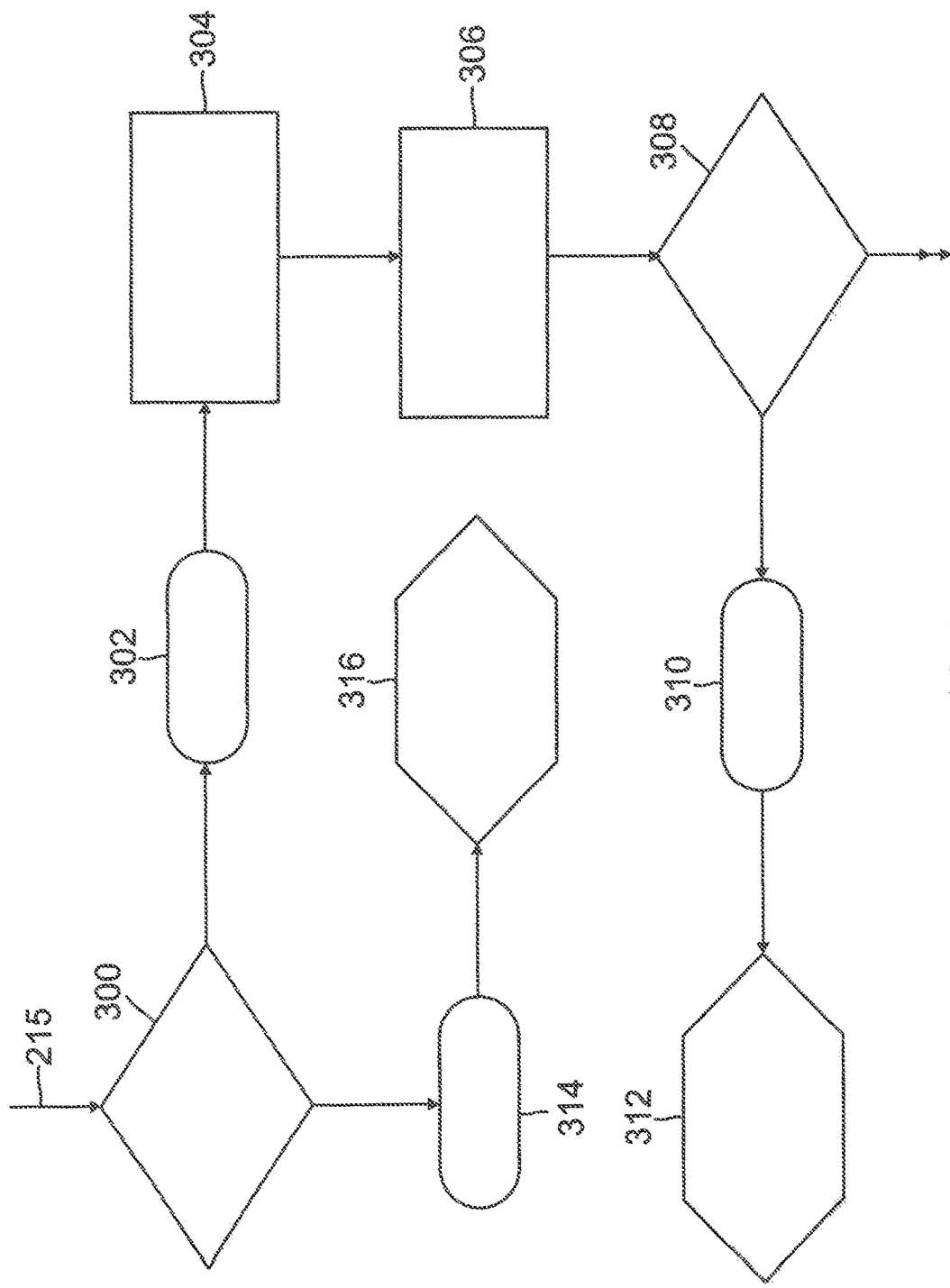
Figure 8:
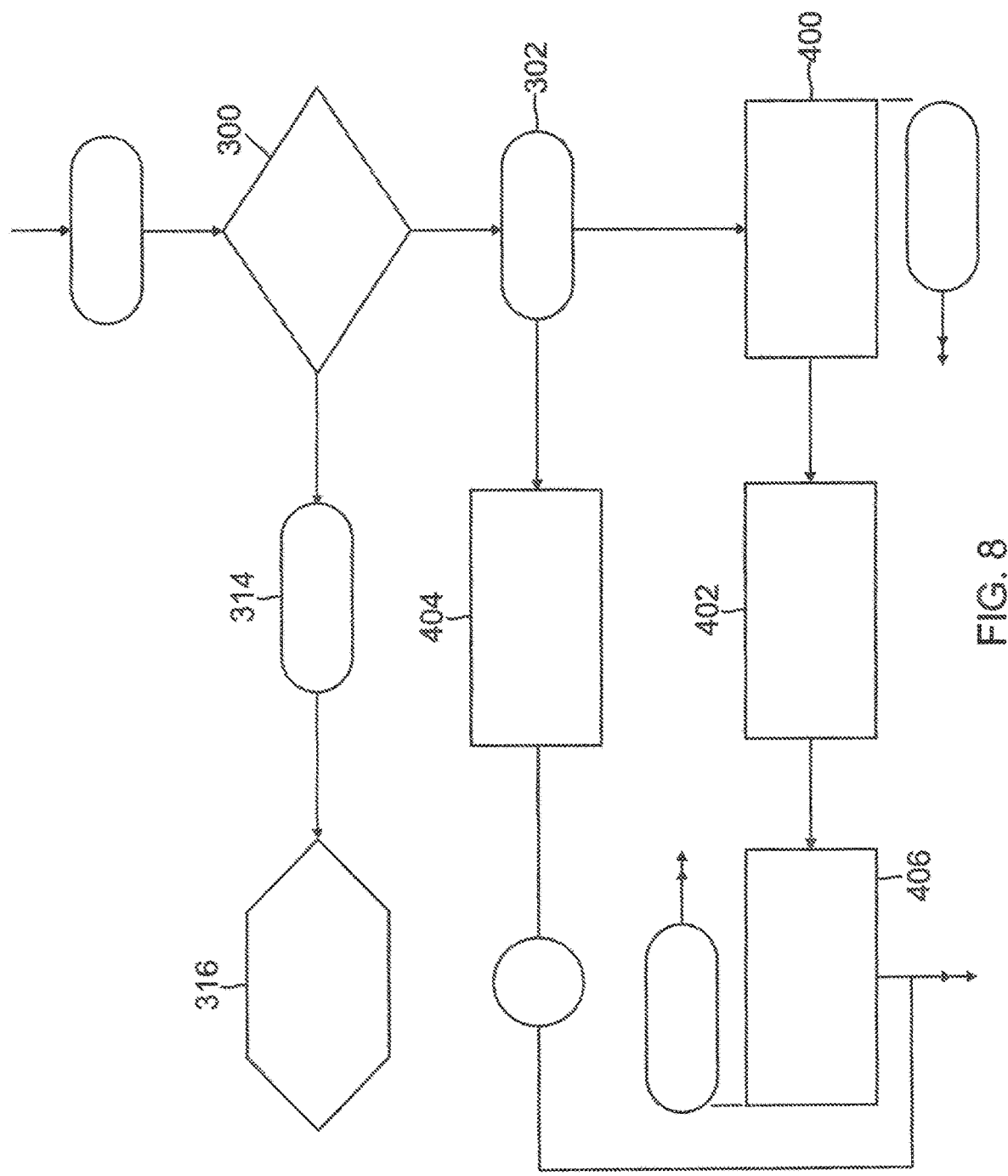

Referring to FIG. 7, if the conveyor sensor confirms the sheet position (blocks 300 and 302), a control block confirms everything is ready (block 304) after a short delay and a conveyor move command is issued (block 306). The system then determines whether the conveyor is in the proper position (block 308). If so, the conveyor sensor confirms the position of the sheets (blocks 300, 302). If the conveyor position ready is not confirmed (block 314), an alarm (block 316) is issued. Referring to FIG. 8, once the conveyor sensor confirms the position of the sheets, the laser cutting unit receives a start command (block 400), which is the beginning of process B and begins the cutting process (block 402) (this corresponds to the second position of the sheet being cut). If the loading of the follow-up sheet is scheduled, process A is repeated (block 404). A signal is issued when the cutting cycle is completed (block 406), thus ending process B.

Figure 9:
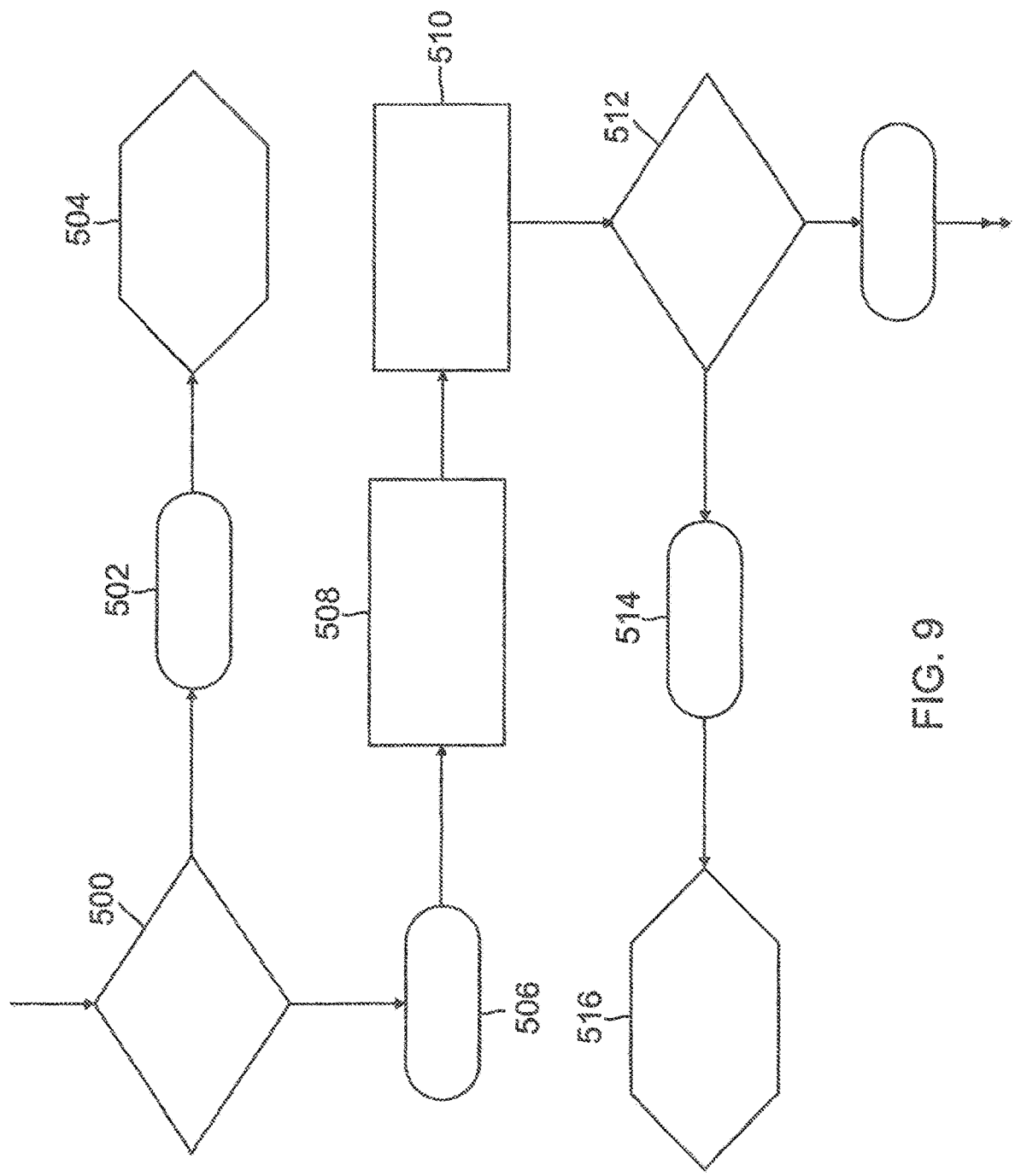
Figure 10:
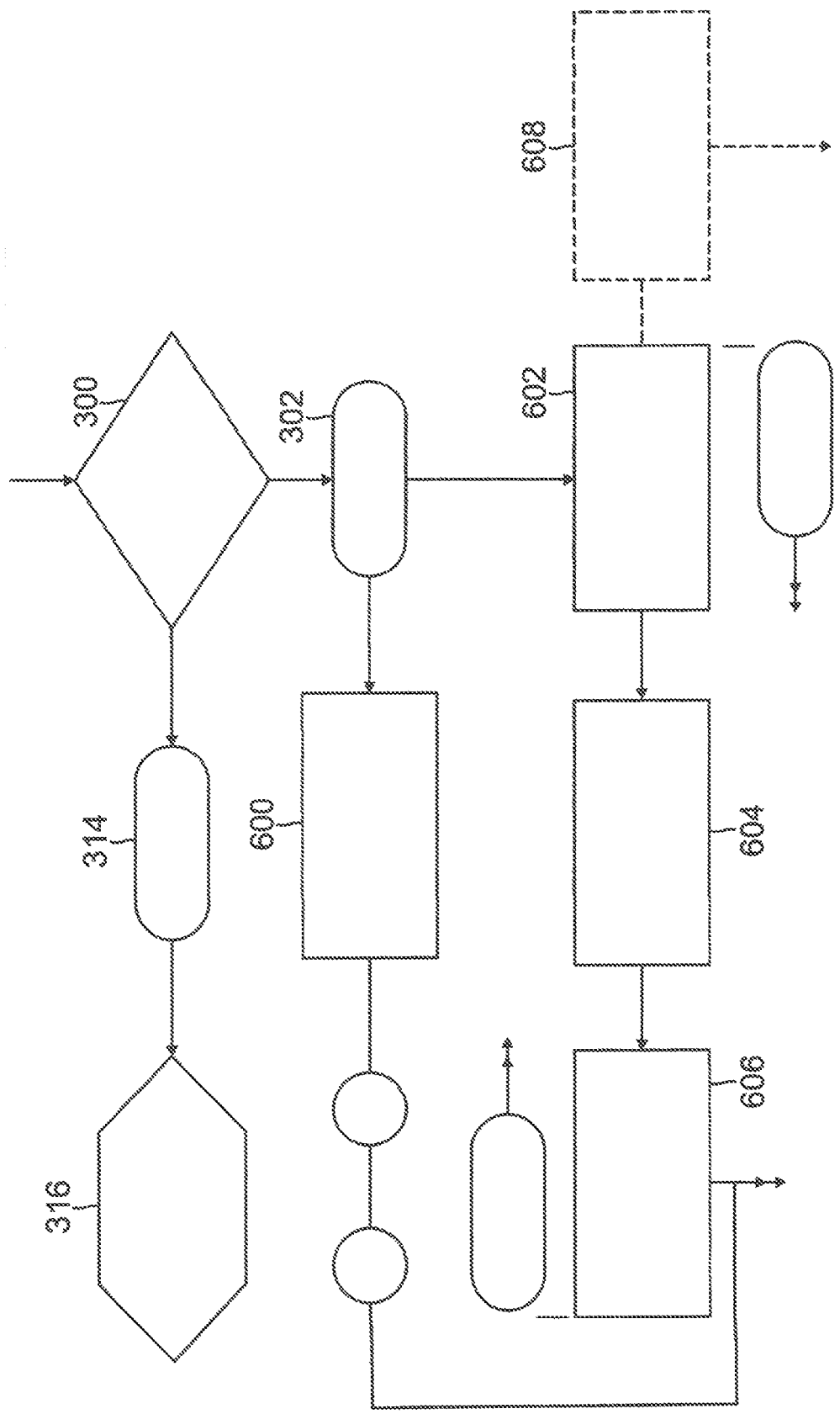

The portion of the operation flowchart shown in FIG. 9 confirms that processes A and B have been completed (block 500). If not completed, an alarm is initiated (block 502, 504). If process A and B are confirmed to be completed (block 506), and the control block is confirmed to be ready (block 508), a conveyor move command is issued (block 510). The system then determines if the conveyor position is correct (block 512); if not, an alarm indication is issued (block 514, 516). Referring to FIG. 10, if the conveyor sensor confirms that the position of the next sheet is correct, processes A and B are repeated if scheduled (block 600). At the same time, the parts-sorting robot (PSR) receives a start command (block 602), which is the start of process C. The PSR unloading cycle starts at the third position (block 604) and a signal indicating that the PSR unloading has been completed (block 606) and process C then ends.

Figure 12:
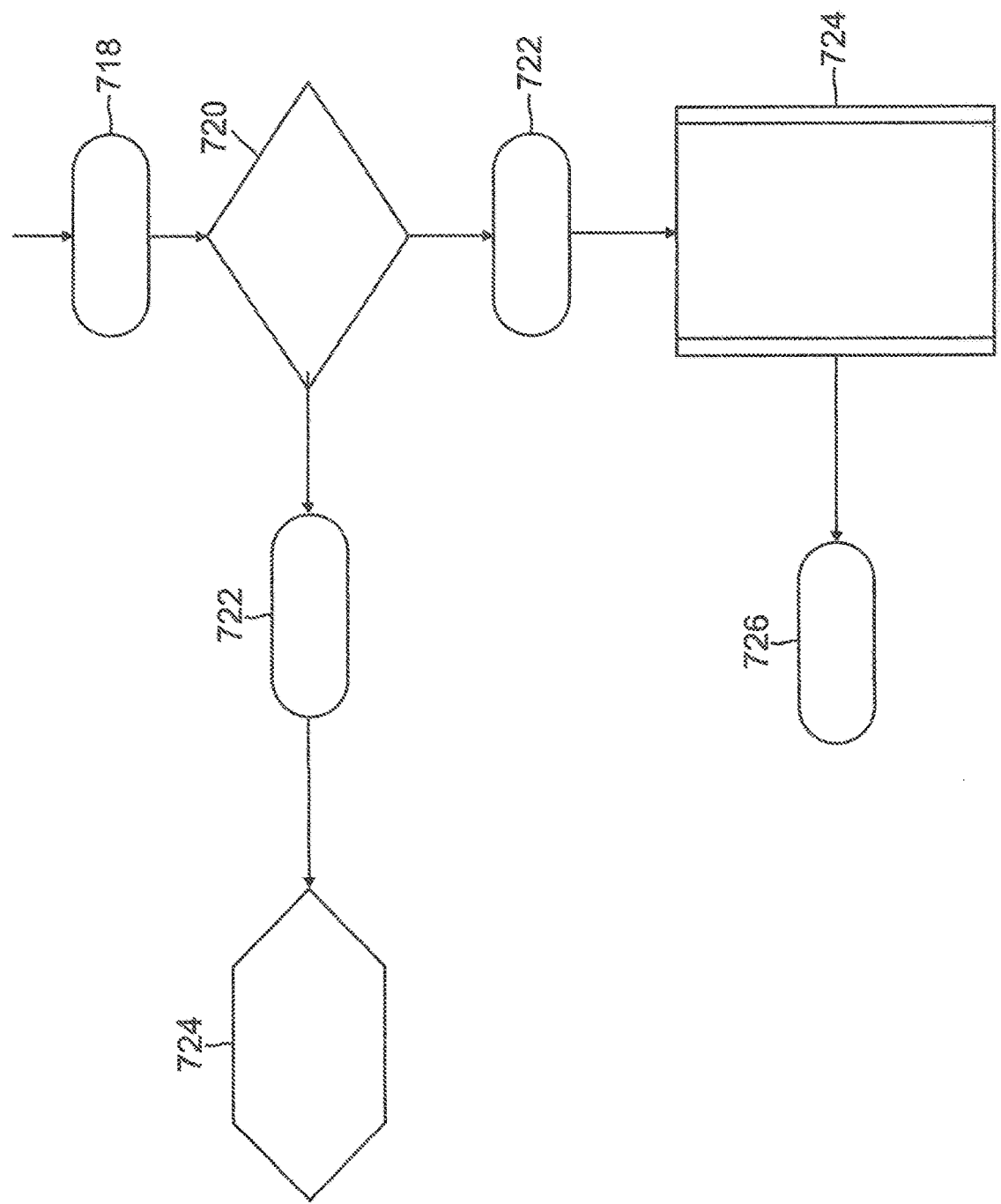

It should be noted that the machine operator could initiate a PSR fault recover (block 608), the flowchart portion therefor being set forth in FIG. 12.

Figure 11:
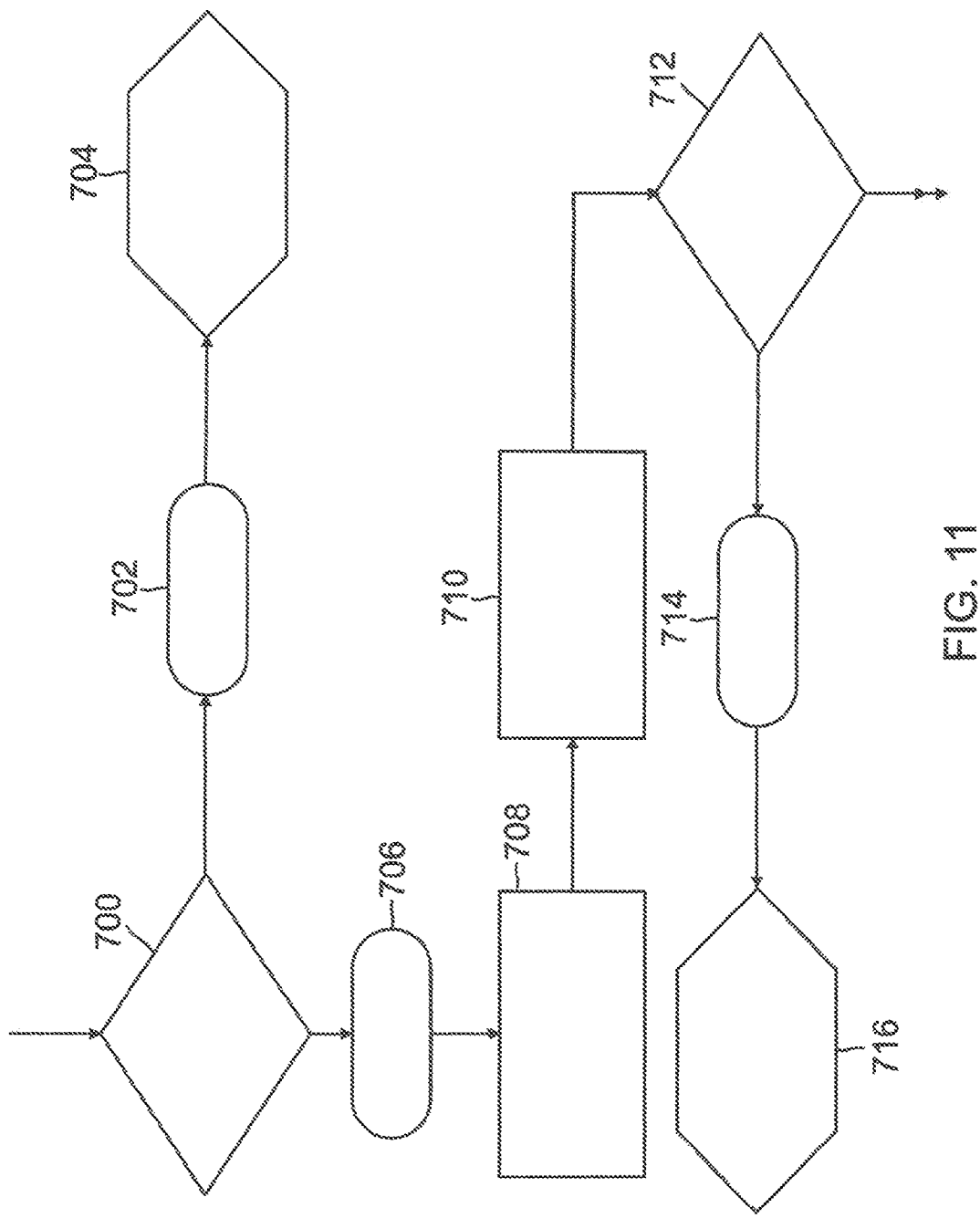

Referring to FIGS. 11 and 12, the system determines whether processes A, B and C have been completed (block 700). If not, an alarm is initiated (block 702, 704). If it is confirmed that processes A, B and C are completed, the control microprocessor is confirmed to be ready after a short (i.e. three-second) delay (block 706, 708). A conveyor move command signal is issued (block 710) and the system then determines if the conveyor position is ready (block 712). If not, an alarm is generated (block 714, 716). If the conveyor position is ready, a conveyor sensor confirms whether the sheets are in the correct positions (block 720); if not, an alarm is sounded (block 722, 724). If the conveyor sensor confirms that the sheets are in the correct position, process A (sheet load), process B (laser cutting) and process C (PSR unload), in accordance with the program schedule (box 722, 724), have been completed and the system is deactivated (block 726).

The parts-sorting recovery flowchart sequence is shown in FIG. 13. If the system sensors detect part pick-up failure, tip-up, or the skeleton portion of the sheet is still attached (block 800), the system operator can skip the unloading of that sheet (block 802). The PSR skips the pick-up and is directed to the next part (block 804), and the PSR resumes normal operation (block 806). If the PSR does not skip pick-up, the system then returns to the sensors detect part pick-up process (block 800). Note that the operator has the option of aborting the part unloading the current sheet as the conveyor advances (block 808, 810) and the PSR then resumes normal operation (block 806). Note that the operator also has the option of attempting to unload the part again (block 812, 814). If successful, the PSR resumes normal operation (block 806). If the pick-up is unsuccessful, the system returns to the sequence wherein the sensors operate whether part pick-up has failed (block 800).

Figure 15:
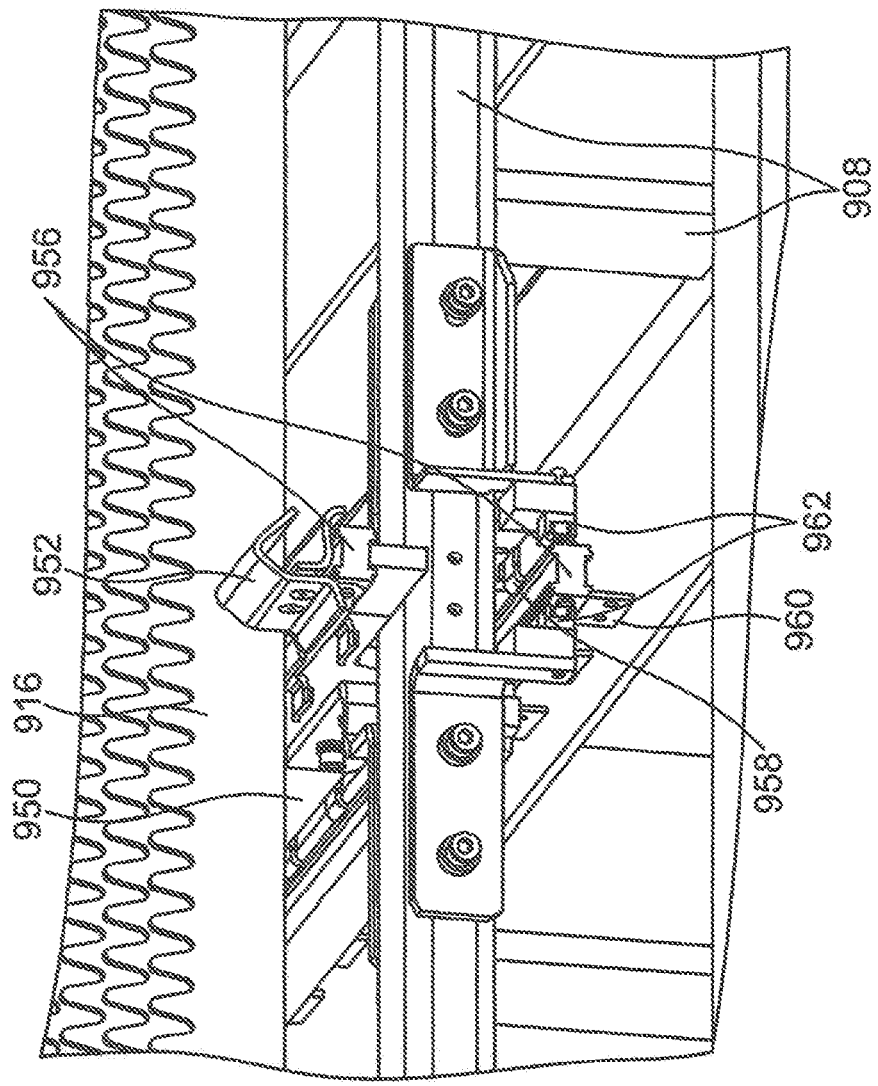
Figure 16:
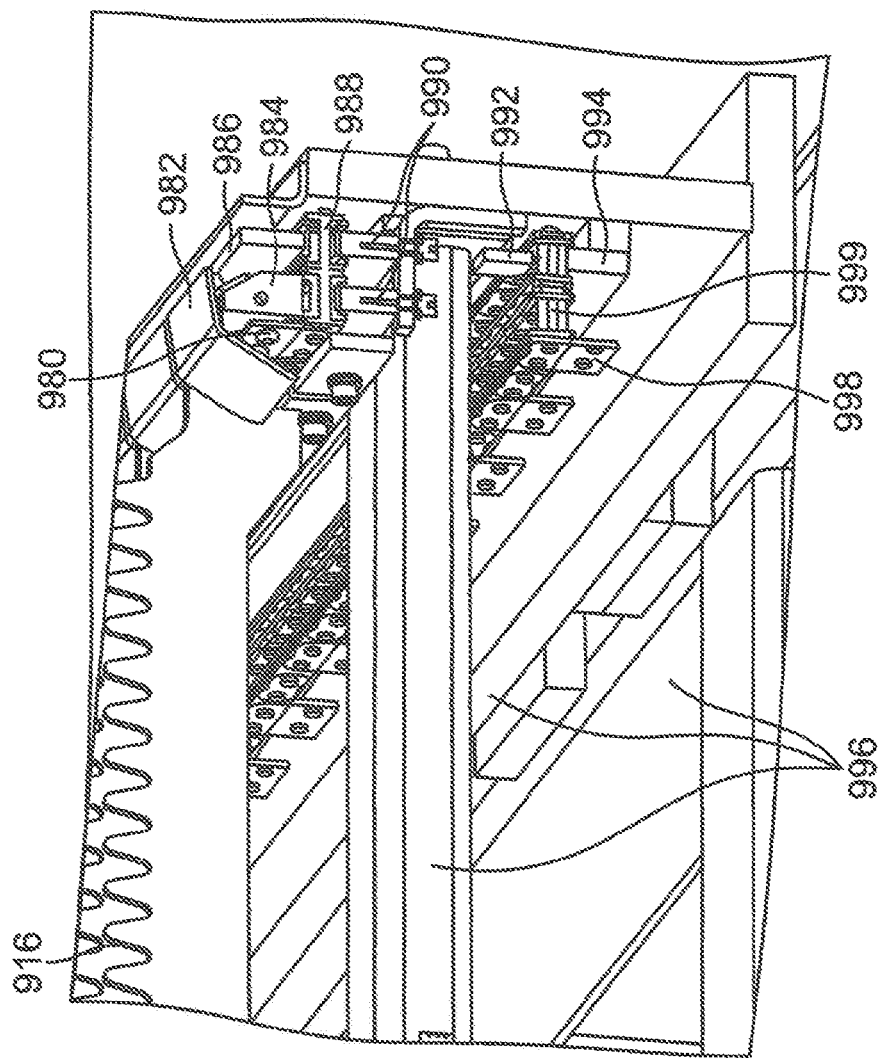

As noted hereinabove, a key feature of the present invention is the "endless" conveyor system which enables material to be cut at speeds that exceed those currently available. Details of the conveyor construction which supports this feature are shown in FIGS. 14-16.

Figure 14:
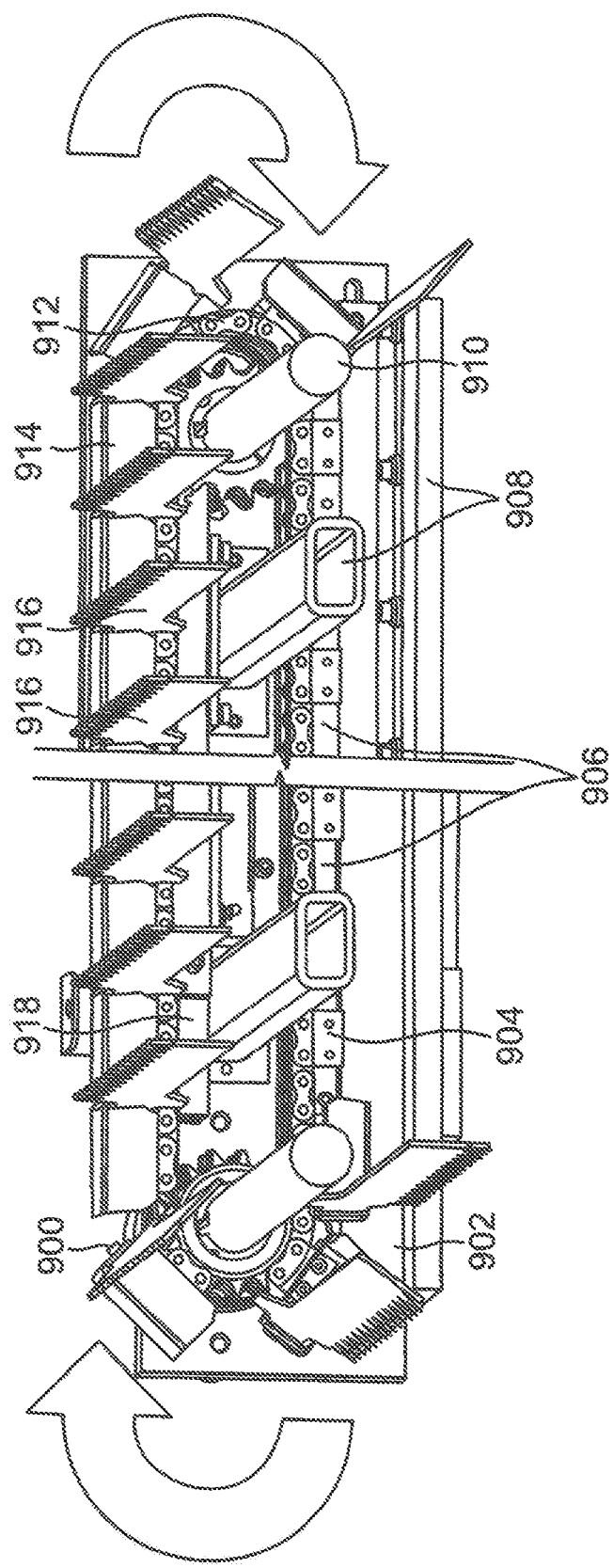
FIGS. 14-16 illustrate components of the unloading portion of the conveyor system.

FIG. 14 is a cut away view along the length of the conveyor and comprises the following components:
  (1) Bolt 900 which holds the cover chain 914 and the skids 916 at both ends to the chain block;
  (2) Drive shaft 902;
  (3) Outer plate 904;
  (4) Lower support rails 906;
  (5) Conveyor frame 908;
  (6) Idler shaft 910;
  (7) Outer roller chain 912;
  (8) Chain cover 914;
  (9) Skids 916; and
  (10) Upper support rails 918.

A servo motor (not shown) drives the conveyor forward by propelling the drive shaft 902 where chain sprockets are mounted for both inner chain 906 (FIG. 18) and outer roller chain 912. Chain movement is synchronized by utilizing a single drive shaft 902. The servo motor precisely controls conveyor position while sensors confirm material placement during loading and conveying operations. Skids 916 are arranged into 5 (five) sections at intervals which allow proper spacing for utilizing loading, cutting, and unloading areas simultaneously.

The conveyor skids 916 provide ma drum open area for air circulation during the cutting process and enables a laser system dust collector (45, FIG. 4) to remove contaminants suspended in the air of the machine cavity during the laser cutting operation. Conveyor skids 916 also allow small shapes cut from the sheet material to pass through the conveyor and into a collector system in place at the base of the laser cutting machine.

FIG. 15 is a cut away view across the conveyor illustrating the inner single chain component parts as follows:

(1) Upper support rail 950;
(2) Skids 916;
(3) Chain cover 952;
(4) Inner roller chain 956;
(5) Bottom chain tab 958;
(6) Plate 960 for mounting chain cover 914;
(7) Lower support rails 962; and
(8) Conveyor frame 908.

The inner single roller chain is driven by the conveyor drive shaft 902 (FIG. 14), the chain being driven by sprockets mounted thereon. Upper support rails 950 support and guide the chain at the rollers. The lower support rails 962 eliminate chain sag by carrying the chain and skid weight using chain tabs 958 integrated into alternating chain side plates.

The outside plate 980 (FIG. 16) of the inner section of the single roller chain is extended to provide a mounting surface for the chain covers 982. These provide center support for the skids 916 and protect the chain and drive mechanisms from the laser cutting residue (molten metal particles) that is expelled during the laser cutting process.

Note that the skids and chain covers (which are exposed to the laser cutting residue) can easily be replaced when residue builds up and/or when exposure to the laser cutting beam reduces the integrity or functionality of these components.

FIG. 16 is a cut away view across the conveyor illustrating the outer double chain component parts as follows:

(1) Skids 916 which are bolted at both ends to chain block 900;
(2) Chain block 984 which is bolted to chain outer plate 980;
(3) Chain cover 904 which is bolted to chain block 984;
(4) Top chain lock 986;
(5) Outer double roller chain 988;
(6) Support rails 990;
(7) Low chain lock 992;
(8) Low chain support 994;
(9) Conveyor frame 996;
(10) Outer plate 998 which carries chain, block 984; and
(11) Outer double roller chain 999.

The outer double roller chain 988 is driven by the conveyor drive shaft 902 and the outer most chain section is driven by sprockets mounted on the drive shaft. The inner section of the double chain has a common roller pin with the outer chain and is also driven by sprockets mounted on the same drive shaft. Chain locks and support rails support and guide the chain on its rollers and eliminates sag.

The outer plate of the inside section of the double roller chain 988 is extended to provide a mounting surface for the chain block 984. This provides the connection between the miler chain 984 and skids 916, allowing the chain to carry them around the conveyor as the conveyor indexes forward. The skids 916 provide the resting surface for the sheet material being loaded onto the conveyor and allows cutting by the laser machine 48 while supporting cut part shapes until unloaded at the end.

The chain covers 914 are bolted on by their mounting tab which is inserted between the chain blocks and skids. These protect the chain and drive mechanisms from the laser cutting residue (molten metal particles) that is expelled during the laser cutting process.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teachings of the invention without departing from its essential teachings.

The invention claimed is:

1. A conveyor system for use in a laser cutting system for rapidly moving first and second material sheets through a plurality of processing stations, the conveyor system comprising:
   a material storage device having shelves for storing said first and second material sheets;
   a first, a second and a third processing station arranged in this order;
   an endless conveyor that indexes one position at a time through the first, second and third processing stations, the endless conveyor being configured such that at each stop the conveyor has a first section associated with the first processing station, a second section associated with the second processing station and a third section associated with the third processing station, wherein the first, second and third processing stations operate simultaneously on the first, second and third sections of the conveyor, respectively, during a same time period when the conveyor is stopped;
   a loading cart movably attached to the material storage device adapted to load said first material sheet on the first section of the conveyor at said first processing station;
   a drive shaft that moves the conveyor one position at a time forward;
   wherein the endless conveyor comprises a chain member that moves in an endless loop and a plurality of chain covers that are attached to the chain member to protect the chain member from residue generated during a laser cutting process, and that move with the chain member in the endless loop;
   a laser cutting station at said second processing station whereby parts are formed in said first material sheet and leaving a remainder of material; and
   a part unloading robot at said third processing station whereby said parts are removed from said first material sheet after it exits said laser cutting station and arrives at the third processing station.

2. The conveyor system of claim 1 further including a fourth station comprising a skeleton conveyor and being positioned downstream from said third processing station for collecting the remainder after said parts are removed from said first material sheet.

3. The conveyor system of claim 2 wherein said first material sheet has a thickness and shape different from said second material sheet.

4. The conveyor system of claim 1 wherein said laser cutting station includes a high speed laser.

5. The conveyor system of claim 1 wherein said second material sheet is loaded on the conveyor at said first processing station after the first material sheet advances to the second processing station.

6. The conveyor system of claim 1 further including a lower support rail for reducing sagging of the chain member during conveyor system operation.

7. The conveyor system of claim 1 further comprising a plurality of skids that are attached to the chain member and that support the first material sheet and move with the chain in the endless loop.

\* \* \* \* \*